United States Patent
Allard et al.

(10) Patent No.: US 10,030,905 B2
(45) Date of Patent: Jul. 24, 2018

(54) METHOD OF FABRICATING A VACUUM INSULATED APPLIANCE STRUCTURE

(71) Applicant: WHIRLPOOL CORPORATION, Benton Harbor, MI (US)

(72) Inventors: Paul B. Allard, Coloma, MI (US); Berhanu Allo, Newburgh, IN (US); Lakshya J. Deka, Mishawaka, IN (US); Hua Liu, St. Joseph, MI (US); Diptesh Mukherjee, Pune (IN)

(73) Assignee: Whirlpool Corporation, Benton Harbor, MI (US)

( * ) Notice: Subject to any disclaimer, the term of this patent is extended or adjusted under 35 U.S.C. 154(b) by 339 days.

(21) Appl. No.: 14/982,652

(22) Filed: Dec. 29, 2015

(65) Prior Publication Data
US 2017/0184340 A1 Jun. 29, 2017

(51) Int. Cl.
*F25D 23/06* (2006.01)
*B29C 45/16* (2006.01)
(Continued)

(52) U.S. Cl.
CPC ........ *F25D 23/066* (2013.01); *B29C 45/1642* (2013.01); *F25D 23/062* (2013.01);
(Continued)

(58) Field of Classification Search
CPC ..... B29C 51/267; B29C 51/082; B29C 51/14; B29C 51/00; B29C 45/1642; B32B 27/32;
(Continued)

(56) References Cited

U.S. PATENT DOCUMENTS

| 948,541 A | 2/1910 | Coleman |
| 1,275,511 A | 8/1918 | Welch |

(Continued)

FOREIGN PATENT DOCUMENTS

| CA | 626838 A | 5/1961 |
| CA | 1320631 | 7/1993 |

(Continued)

OTHER PUBLICATIONS

BASF, "Balindur™ Solutions for fixing Vaccum Insulated Panels," web page, 4 pages, date unknown, http://performance-materials.basf.us/products/view/family/balindur, at least as early as Dec. 21, 2015.

(Continued)

*Primary Examiner* — Sarang Afzali
(74) *Attorney, Agent, or Firm* — Price Heneveld LLP

(57) ABSTRACT

A method of fabricating a vacuum insulated refrigerator structure includes injection molding a first layer of a first polymer material. A second layer of a second polymer material is injection molded over at least a portion of the first layer, and a third layer of a third polymer material is injection molded over at least a portion of the second layer to form a first component. At least one of the layers is impervious to one or more gasses. A second component is secured to the first component to form a vacuum cavity therebetween. The vacuum cavity is filled with a porous material, and the vacuum cavity is evacuated to form a vacuum. At least one of the first and third layers includes a structural reinforcement such as a rib or screw boss of increased thickness that is formed during the injection molding process.

15 Claims, 6 Drawing Sheets

(51) Int. Cl.
  *B29K 23/00* (2006.01)
  *B29L 31/00* (2006.01)
(52) U.S. Cl.
  CPC .................. *B29K 2023/086* (2013.01); *B29K 2995/0067* (2013.01); *B29L 2031/7622* (2013.01); *F25D 2201/14* (2013.01); *Y10T 29/49359* (2015.01); *Y10T 29/49366* (2015.01); *Y10T 29/49982* (2015.01)
(58) Field of Classification Search
  CPC .. F25D 23/062; F25D 23/066; F25D 2201/14; B29K 2995/0067; B29K 2023/086; B29L 2031/7622; Y10T 29/49359; Y10T 29/49366; Y10T 29/4998; Y10T 29/49982; Y10T 29/49993
  See application file for complete search history.

(56) References Cited

U.S. PATENT DOCUMENTS

| | | |
|---|---|---|
| 1,849,369 A | 3/1932 | Frost |
| 2,108,212 A | 2/1938 | Schellens |
| 2,128,336 A | 8/1938 | Torstensson |
| 2,164,143 A | 6/1939 | Munters |
| 2,318,744 A | 5/1943 | Brown |
| 2,356,827 A | 8/1944 | Coss et al. |
| 2,432,042 A | 12/1947 | Richard |
| 2,439,602 A | 4/1948 | Heritage |
| 2,439,603 A | 4/1948 | Heritage |
| 2,451,884 A | 10/1948 | Stelzer |
| 2,538,780 A | 1/1951 | Hazard |
| 2,559,356 A | 7/1951 | Hedges |
| 2,729,863 A | 1/1956 | Kurtz |
| 2,768,046 A | 10/1956 | Evans |
| 2,817,123 A | 12/1957 | Jacobs |
| 2,942,438 A | 6/1960 | Schmeling |
| 2,985,075 A | 5/1961 | Knutsson-Hall |
| 3,086,830 A | 4/1963 | Malia |
| 3,125,388 A | 3/1964 | Costantini et al. |
| 3,137,900 A | 6/1964 | Carbary |
| 3,218,111 A | 11/1965 | Steiner |
| 3,258,883 A | 7/1966 | Campanaro et al. |
| 3,358,059 A | 12/1967 | Snyder |
| 3,379,481 A | 4/1968 | Fisher |
| 3,408,316 A | 10/1968 | Mueller et al. |
| 3,471,416 A | 10/1969 | Fijal |
| 3,597,850 A | 8/1971 | Jenkins |
| 3,607,169 A | 9/1971 | Coxe |
| 3,634,971 A | 1/1972 | Kesling |
| 3,635,536 A | 1/1972 | Lackey et al. |
| 3,688,384 A | 9/1972 | Mizushima et al. |
| 3,769,770 A | 11/1973 | Deschamps et al. |
| 3,862,880 A | 1/1975 | Feldman |
| 3,868,829 A | 3/1975 | Mann et al. |
| 3,875,683 A | 4/1975 | Waters |
| 3,910,658 A | 10/1975 | Lindenschmidt |
| 3,933,398 A | 1/1976 | Haag |
| 3,935,787 A | 2/1976 | Fisher |
| 4,006,947 A | 2/1977 | Haag et al. |
| 4,043,624 A | 8/1977 | Lindenschmidt |
| 4,050,145 A | 9/1977 | Benford |
| 4,067,628 A | 1/1978 | Sherburn |
| 4,170,391 A | 10/1979 | Bottger |
| 4,242,241 A | 12/1980 | Rosen et al. |
| 4,260,876 A | 4/1981 | Hochheiser |
| 4,303,730 A | 12/1981 | Torobin |
| 4,303,732 A | 12/1981 | Torobin |
| 4,325,734 A | 4/1982 | Burrage et al. |
| 4,332,429 A | 6/1982 | Frick et al. |
| 4,396,362 A | 8/1983 | Thompson et al. |
| 4,417,382 A | 11/1983 | Schilf |
| 4,492,368 A | 1/1985 | DeLeeuw et al. |
| 4,529,368 A | 7/1985 | Makansi |
| 4,548,196 A | 10/1985 | Torobin |
| 4,583,796 A | 4/1986 | Nakajima et al. |
| 4,660,271 A | 4/1987 | Lenhardt |
| 4,671,909 A | 6/1987 | Torobin |
| 4,671,985 A | 6/1987 | Rodrigues et al. |
| 4,745,015 A | 5/1988 | Cheng et al. |
| 4,777,154 A | 10/1988 | Torobin |
| 4,805,293 A | 2/1989 | Buchser |
| 4,917,841 A | 4/1990 | Jenkins |
| 5,007,226 A | 4/1991 | Nelson |
| 5,018,328 A | 5/1991 | Cur et al. |
| 5,033,636 A | 7/1991 | Jenkins |
| 5,066,437 A | 11/1991 | Barito et al. |
| 5,082,335 A | 1/1992 | Cur et al. |
| 5,094,899 A | 3/1992 | Rusek, Jr. |
| 5,118,174 A | 6/1992 | Benford et al. |
| 5,121,593 A | 6/1992 | Forslund |
| 5,157,893 A | 10/1992 | Benson et al. |
| 5,168,674 A | 12/1992 | Molthen |
| 5,171,346 A | 12/1992 | Hallett |
| 5,175,975 A | 1/1993 | Benson et al. |
| 5,212,143 A | 5/1993 | Torobin |
| 5,221,136 A | 6/1993 | Hauck et al. |
| 5,227,245 A | 7/1993 | Brands et al. |
| 5,231,811 A | 8/1993 | Andrepont et al. |
| 5,248,196 A | 9/1993 | Lynn et al. |
| 5,252,408 A | 10/1993 | Bridges et al. |
| 5,263,773 A | 11/1993 | Gable et al. |
| 5,273,801 A | 12/1993 | Barry et al. |
| 5,318,108 A | 6/1994 | Benson et al. |
| 5,340,208 A | 8/1994 | Hauck et al. |
| 5,353,868 A | 10/1994 | Abbott |
| 5,359,795 A | 11/1994 | Mawby et al. |
| 5,375,428 A | 12/1994 | LeClear et al. |
| 5,397,759 A | 3/1995 | Torobin |
| 5,418,055 A | 5/1995 | Chen et al. |
| 5,433,056 A | 7/1995 | Benson et al. |
| 5,477,676 A | 12/1995 | Benson et al. |
| 5,500,287 A | 3/1996 | Henderson |
| 5,500,305 A | 3/1996 | Bridges et al. |
| 5,505,810 A | 4/1996 | Kirby et al. |
| 5,507,999 A | 4/1996 | Copsey et al. |
| 5,509,248 A | 4/1996 | Dellby et al. |
| 5,512,345 A | 4/1996 | Tsusumi et al. |
| 5,532,034 A | 7/1996 | Kirby et al. |
| 5,533,311 A | 7/1996 | Tirrell et al. |
| 5,562,154 A | 10/1996 | Benson et al. |
| 5,586,680 A | 12/1996 | Dellby et al. |
| 5,599,081 A | 2/1997 | Revlett et al. |
| 5,600,966 A | 2/1997 | Valence et al. |
| 5,632,543 A | 5/1997 | Mcgrath et al. |
| 5,635,129 A * | 6/1997 | Breezer ................ B29C 43/183 264/154 |
| 5,640,828 A | 6/1997 | Reeves et al. |
| 5,643,485 A | 7/1997 | Potter et al. |
| 5,652,039 A | 7/1997 | Tremain et al. |
| 5,716,581 A | 2/1998 | Tirell et al. |
| 5,768,837 A | 6/1998 | Sjoholm |
| 5,792,801 A | 8/1998 | Tsuda et al. |
| 5,813,454 A | 9/1998 | Potter |
| 5,826,780 A | 10/1998 | Neeser et al. |
| 5,827,385 A | 10/1998 | Meyer et al. |
| 5,834,126 A | 11/1998 | Sheu |
| 5,843,353 A | 12/1998 | Devos et al. |
| 5,866,228 A | 2/1999 | Awata |
| 5,868,890 A | 2/1999 | Fredrick |
| 5,900,299 A | 5/1999 | Wynne |
| 5,918,478 A | 7/1999 | Bostic et al. |
| 5,924,295 A | 7/1999 | Park |
| 5,950,395 A | 9/1999 | Takemasa et al. |
| 5,952,404 A | 9/1999 | Simpson et al. |
| 5,966,963 A | 10/1999 | Kovalaske |
| 5,985,189 A | 11/1999 | Lynn et al. |
| 6,013,700 A | 1/2000 | Asano et al. |
| 6,063,471 A | 5/2000 | Dietrich et al. |
| 6,094,922 A | 8/2000 | Ziegler |
| 6,109,712 A | 8/2000 | Haworth et al. |
| 6,128,914 A | 10/2000 | Tamaoki et al. |
| 6,132,837 A | 10/2000 | Boes et al. |
| 6,158,233 A | 12/2000 | Cohen et al. |

(56) References Cited

U.S. PATENT DOCUMENTS

| | | |
|---|---|---|
| 6,163,976 A | 12/2000 | Tada et al. |
| 6,164,030 A | 12/2000 | Dietrich |
| 6,164,739 A | 12/2000 | Schulz et al. |
| 6,187,256 B1 | 2/2001 | Aslan et al. |
| 6,209,342 B1 | 4/2001 | Banicevic et al. |
| 6,210,625 B1 | 4/2001 | Matsushita et al. |
| 6,220,473 B1 | 4/2001 | Lehman et al. |
| 6,221,456 B1 | 4/2001 | Pogorski et al. |
| 6,224,179 B1 | 5/2001 | Wenning et al. |
| 6,244,458 B1 | 6/2001 | Frysinger et al. |
| 6,260,377 B1 | 7/2001 | Tamaoki et al. |
| 6,294,595 B1 | 9/2001 | Tyagi et al. |
| 6,305,768 B1 | 10/2001 | Nishimoto |
| 6,390,378 B1 | 5/2002 | Briscoe, Jr. et al. |
| 6,406,449 B1 | 6/2002 | Moore et al. |
| 6,408,841 B1 | 6/2002 | Hirath et al. |
| 6,415,623 B1 | 7/2002 | Jennings et al. |
| 6,430,780 B1 | 8/2002 | Kim et al. |
| 6,460,955 B1 | 10/2002 | Vaughan et al. |
| 6,623,413 B1 | 9/2003 | Wynne |
| 6,689,840 B1 | 2/2004 | Eustace et al. |
| 6,716,501 B2 | 4/2004 | Kovalchuk et al. |
| 6,736,472 B2 | 5/2004 | Banicevic |
| 6,749,780 B2 | 6/2004 | Tobias |
| 6,773,082 B2 | 8/2004 | Lee |
| 6,858,280 B2 | 2/2005 | Allen et al. |
| 6,860,082 B1 | 3/2005 | Yamamoto et al. |
| 6,938,968 B2 | 9/2005 | Tanimoto et al. |
| 7,008,032 B2 | 3/2006 | Chekal et al. |
| 7,026,054 B2 | 4/2006 | Ikegawa et al. |
| 7,197,792 B2 | 4/2007 | Moon |
| 7,197,888 B2 | 4/2007 | LeClear et al. |
| 7,207,181 B2 | 4/2007 | Murray et al. |
| 7,210,308 B2 | 5/2007 | Tanimoto et al. |
| 7,234,247 B2 | 6/2007 | Maguire |
| 7,263,744 B2 | 9/2007 | Kim et al. |
| 7,284,390 B2 | 10/2007 | Van Meter et al. |
| 7,296,432 B2 | 11/2007 | Muller et al. |
| 7,316,125 B2 | 1/2008 | Uekado et al. |
| 7,343,757 B2 | 3/2008 | Egan et al. |
| 7,360,371 B2 | 4/2008 | Feinauer et al. |
| 7,449,227 B2 | 11/2008 | Echigoya et al. |
| 7,475,562 B2 | 1/2009 | Jackovin |
| 7,517,031 B2 | 4/2009 | Laible |
| 7,614,244 B2 | 11/2009 | Venkatakrishnan et al. |
| 7,625,622 B2 | 12/2009 | Teckoe et al. |
| 7,641,298 B2 | 1/2010 | Hirath et al. |
| 7,665,326 B2 | 2/2010 | LeClear et al. |
| 7,703,217 B2 | 4/2010 | Tada et al. |
| 7,703,824 B2 | 4/2010 | Kittelson et al. |
| 7,757,511 B2 | 7/2010 | LeClear et al. |
| 7,762,634 B2 | 7/2010 | Tenra et al. |
| 7,794,805 B2 | 9/2010 | Aumaugher et al. |
| 7,815,269 B2 | 10/2010 | Wenning et al. |
| 7,842,269 B2 | 11/2010 | Schachtely et al. |
| 7,845,745 B2 | 12/2010 | Gorz et al. |
| 7,861,538 B2 | 1/2011 | Welle et al. |
| 7,886,559 B2 | 2/2011 | Hell et al. |
| 7,893,123 B2 | 2/2011 | Luisi |
| 7,908,873 B1 | 3/2011 | Cur et al. |
| 7,930,892 B1 | 4/2011 | Vonderhaar |
| 7,938,148 B2 | 5/2011 | Carlier et al. |
| 7,992,257 B2 | 8/2011 | Kim |
| 8,049,518 B2 | 11/2011 | Wern et al. |
| 8,074,469 B2 | 12/2011 | Hamel et al. |
| 8,079,652 B2 | 12/2011 | Laible et al. |
| 8,108,972 B2 | 2/2012 | Bae et al. |
| 8,113,604 B2 | 2/2012 | Olson et al. |
| 8,117,865 B2 | 2/2012 | Allard et al. |
| 8,157,338 B2 | 4/2012 | Seo et al. |
| 8,162,415 B2 | 4/2012 | Hagele et al. |
| 8,163,080 B2 | 4/2012 | Meyer et al. |
| 8,176,746 B2 | 5/2012 | Allard et al. |
| 8,182,051 B2 | 5/2012 | Laible et al. |
| 8,197,019 B2 | 6/2012 | Kim |
| 8,202,599 B2 | 6/2012 | Henn |
| 8,211,523 B2 | 7/2012 | Fujimori et al. |
| 8,266,923 B2 | 9/2012 | Bauer et al. |
| 8,281,558 B2 | 10/2012 | Heimeyer et al. |
| 8,343,395 B2 | 1/2013 | Hu et al. |
| 8,353,177 B2 | 1/2013 | Adamski et al. |
| 8,382,219 B2 | 2/2013 | Hottmann et al. |
| 8,434,317 B2 | 5/2013 | Besore |
| 8,439,460 B2 | 5/2013 | Laible et al. |
| 8,491,070 B2 | 7/2013 | Davis et al. |
| 8,516,845 B2 | 8/2013 | Wuesthoff et al. |
| 8,528,284 B2 | 9/2013 | Aspenson et al. |
| 8,590,992 B2 | 11/2013 | Lim et al. |
| 8,717,029 B2 | 5/2014 | Chae et al. |
| 8,739,568 B2 | 6/2014 | Allard et al. |
| 8,752,918 B2 | 6/2014 | Kang |
| 8,752,921 B2 | 6/2014 | Gorz et al. |
| 8,763,847 B2 | 7/2014 | Mortarotti |
| 8,764,133 B2 | 7/2014 | Park et al. |
| 8,770,682 B2 | 7/2014 | Lee et al. |
| 8,776,390 B2 | 7/2014 | Hanaoka et al. |
| 8,840,204 B2 | 9/2014 | Bauer et al. |
| 8,852,708 B2 | 10/2014 | Kim et al. |
| 8,881,398 B2 | 11/2014 | Hanley et al. |
| 8,905,503 B2 | 12/2014 | Sahasrabudhe et al. |
| 9,009,969 B2 | 4/2015 | Choi et al. |
| RE45,501 E | 5/2015 | Maguire |
| 9,056,952 B2 | 6/2015 | Eilbracht et al. |
| 9,074,811 B2 | 7/2015 | Korkmaz |
| 9,080,808 B2 | 7/2015 | Choi et al. |
| 9,102,076 B2 | 8/2015 | Doshi et al. |
| 9,103,482 B2 | 8/2015 | Fujimori et al. |
| 9,125,546 B2 | 9/2015 | Kleemann et al. |
| 9,140,480 B2 | 9/2015 | Kuehl et al. |
| 9,170,045 B2 | 10/2015 | Oh et al. |
| 8,955,352 B2 | 12/2015 | Lee et al. |
| 9,221,210 B2 | 12/2015 | Wu et al. |
| 9,228,386 B2 | 1/2016 | Thielmann et al. |
| 9,267,727 B2 | 2/2016 | Lim et al. |
| 9,303,915 B2 | 4/2016 | Kim et al. |
| 9,328,951 B2 | 5/2016 | Shin et al. |
| 9,353,984 B2 | 5/2016 | Kim et al. |
| 9,410,732 B2 | 8/2016 | Choi et al. |
| 9,429,356 B2 | 8/2016 | Kim et al. |
| 9,448,004 B2 | 9/2016 | Kim et al. |
| 9,463,917 B2 | 10/2016 | Wu et al. |
| 9,482,463 B2 | 11/2016 | Choi et al. |
| 9,506,689 B2 | 11/2016 | Carbajal et al. |
| 9,518,777 B2 | 12/2016 | Lee et al. |
| 9,568,238 B2 | 2/2017 | Kim et al. |
| D781,641 S | 3/2017 | Incukur |
| D781,642 S | 3/2017 | Incukur |
| 9,605,891 B2 | 3/2017 | Lee et al. |
| 9,696,085 B2 | 7/2017 | Seo et al. |
| 9,702,621 B2 | 7/2017 | Cho et al. |
| 9,759,479 B2 | 9/2017 | Ramm et al. |
| 9,777,958 B2 | 10/2017 | Choi et al. |
| 9,791,204 B2 | 10/2017 | Kim et al. |
| 2002/0114937 A1 | 8/2002 | Albert et al. |
| 2002/0168496 A1 | 11/2002 | Morimoto et al. |
| 2003/0006025 A1* | 1/2003 | Manini ............... B32B 3/04 165/135 |
| 2003/0008100 A1 | 1/2003 | Horn |
| 2003/0056334 A1 | 3/2003 | Finkelstein |
| 2003/0173883 A1 | 9/2003 | Koons |
| 2004/0178707 A1 | 9/2004 | Avendano |
| 2004/0180176 A1 | 9/2004 | Rusek |
| 2004/0226141 A1 | 11/2004 | Yates et al. |
| 2004/0253406 A1 | 12/2004 | Hayashi et al. |
| 2005/0042247 A1 | 2/2005 | Gomoll et al. |
| 2005/0229614 A1 | 10/2005 | Ansted |
| 2005/0235682 A1 | 10/2005 | Hirai et al. |
| 2006/0064846 A1 | 3/2006 | Espindola et al. |
| 2006/0076863 A1 | 4/2006 | Echigoya et al. |
| 2006/0201189 A1 | 9/2006 | Adamski et al. |
| 2006/0263571 A1 | 11/2006 | Tsunetsugu et al. |
| 2007/0001563 A1 | 1/2007 | Park et al. |
| 2007/0099502 A1 | 5/2007 | Ferinauer |
| 2007/0176526 A1 | 8/2007 | Gomoll et al. |

(56) References Cited

U.S. PATENT DOCUMENTS

| | | |
|---|---|---|
| 2007/0266654 A1 | 11/2007 | Noale |
| 2008/0048540 A1 | 2/2008 | Kim |
| 2008/0300356 A1 | 12/2008 | Meyer et al. |
| 2008/0309210 A1 | 12/2008 | Luisi et al. |
| 2009/0032541 A1 | 2/2009 | Rogala et al. |
| 2009/0056367 A1 | 3/2009 | Neumann |
| 2009/0058244 A1 | 3/2009 | Cho et al. |
| 2009/0113925 A1 | 5/2009 | Korkmaz |
| 2009/0131571 A1 | 5/2009 | Fraser et al. |
| 2009/0179541 A1 | 7/2009 | Smith et al. |
| 2009/0205357 A1 | 8/2009 | Lim et al. |
| 2009/0302728 A1 | 12/2009 | Rotter et al. |
| 2009/0322470 A1 | 12/2009 | Yoo et al. |
| 2009/0324871 A1 | 12/2009 | Henn |
| 2010/0170279 A1 | 7/2010 | Aoki |
| 2010/0206464 A1 | 8/2010 | Heo et al. |
| 2010/0231109 A1 | 9/2010 | Matzke et al. |
| 2010/0287843 A1 | 11/2010 | Oh |
| 2010/0287974 A1 | 11/2010 | Cur et al. |
| 2010/0293984 A1 | 11/2010 | Adamski et al. |
| 2010/0295435 A1 | 11/2010 | Kendall et al. |
| 2011/0011119 A1 | 1/2011 | Kuehl et al. |
| 2011/0023527 A1 | 2/2011 | Kwon et al. |
| 2011/0030894 A1 | 2/2011 | Tenra et al. |
| 2011/0095669 A1 | 4/2011 | Moon et al. |
| 2011/0146325 A1 | 6/2011 | Lee |
| 2011/0146335 A1 | 6/2011 | Jung et al. |
| 2011/0165367 A1 | 7/2011 | Kojima et al. |
| 2011/0215694 A1 | 9/2011 | Fink et al. |
| 2011/0220662 A1 | 9/2011 | Kim et al. |
| 2011/0241513 A1 | 10/2011 | Nomura et al. |
| 2011/0241514 A1 | 10/2011 | Nomura et al. |
| 2011/0260351 A1 | 10/2011 | Corradi et al. |
| 2011/0290808 A1 | 12/2011 | Bai et al. |
| 2011/0309732 A1 | 12/2011 | Horil et al. |
| 2011/0315693 A1 | 12/2011 | Cur et al. |
| 2012/0000234 A1 | 1/2012 | Adamski et al. |
| 2012/0060544 A1 | 3/2012 | Lee et al. |
| 2012/0099255 A1 | 4/2012 | Lee et al. |
| 2012/0103006 A1 | 5/2012 | Jung et al. |
| 2012/0104923 A1 | 5/2012 | Jung et al. |
| 2012/0118002 A1 | 5/2012 | Kim et al. |
| 2012/0137501 A1 | 6/2012 | Allard et al. |
| 2012/0152151 A1 | 6/2012 | Meyer et al. |
| 2012/0196059 A1 | 8/2012 | Fujimori et al. |
| 2012/0231204 A1 | 9/2012 | Jeon et al. |
| 2012/0237715 A1 | 9/2012 | Mccracken |
| 2012/0240612 A1 | 9/2012 | Wusthoff et al. |
| 2012/0273111 A1 | 11/2012 | Nomura et al. |
| 2012/0279247 A1 | 11/2012 | Katu et al. |
| 2012/0280608 A1 | 11/2012 | Park et al. |
| 2012/0285971 A1 | 11/2012 | Junge et al. |
| 2012/0297813 A1 | 11/2012 | Hanley et al. |
| 2012/0324937 A1 | 12/2012 | Adamski et al. |
| 2013/0026900 A1 | 1/2013 | Oh et al. |
| 2013/0033163 A1 | 2/2013 | Kang |
| 2013/0043780 A1 | 2/2013 | Ootsuka et al. |
| 2013/0068990 A1 | 3/2013 | Eilbracht et al. |
| 2013/0111941 A1 | 5/2013 | Yu et al. |
| 2013/0221819 A1 | 8/2013 | Wing |
| 2013/0255304 A1 | 10/2013 | Cur et al. |
| 2013/0256318 A1 | 10/2013 | Kuehl et al. |
| 2013/0256319 A1 | 10/2013 | Kuehl et al. |
| 2013/0257256 A1 | 10/2013 | Allard et al. |
| 2013/0257257 A1 | 10/2013 | Cur et al. |
| 2013/0264439 A1 | 10/2013 | Allard et al. |
| 2013/0270732 A1 | 10/2013 | Wu et al. |
| 2013/0285527 A1 | 10/2013 | Choi et al. |
| 2013/0293080 A1 | 11/2013 | Kim et al. |
| 2013/0305535 A1 | 11/2013 | Cur et al. |
| 2014/0009055 A1 | 1/2014 | Cho et al. |
| 2014/0097733 A1 | 4/2014 | Seo et al. |
| 2014/0132144 A1 | 5/2014 | Kim et al. |
| 2014/0166926 A1 | 6/2014 | Lee et al. |
| 2014/0171578 A1 | 6/2014 | Meyer et al. |
| 2014/0190978 A1 | 7/2014 | Bowman et al. |
| 2014/0216706 A1 | 8/2014 | Melton et al. |
| 2014/0232250 A1 | 8/2014 | Kim et al. |
| 2014/0260332 A1 | 9/2014 | Wu |
| 2014/0346942 A1 | 11/2014 | Kim et al. |
| 2014/0364527 A1 | 12/2014 | Wintermantel et al. |
| 2015/0015133 A1 | 1/2015 | Carbajal et al. |
| 2015/0027628 A1 | 1/2015 | Cravens et al. |
| 2015/0059399 A1 | 3/2015 | Hwang et al. |
| 2015/0115790 A1 | 4/2015 | Ogg |
| 2015/0147514 A1 | 5/2015 | Shinohara et al. |
| 2015/0159936 A1 | 6/2015 | Oh et al. |
| 2015/0168050 A1 | 6/2015 | Cur et al. |
| 2015/0184923 A1 | 7/2015 | Jeon |
| 2015/0190840 A1 | 7/2015 | Muto et al. |
| 2015/0241115 A1 | 8/2015 | Strauss et al. |
| 2015/0285551 A1 | 10/2015 | Aiken et al. |
| 2016/0084567 A1 | 3/2016 | Fernandez et al. |
| 2016/0116100 A1 | 4/2016 | Thiery et al. |
| 2016/0123055 A1 | 5/2016 | Ueyama |
| 2016/0161175 A1 | 6/2016 | Benold et al. |
| 2016/0178267 A1 | 6/2016 | Hao et al. |
| 2016/0178269 A1 | 6/2016 | Hiemeyer et al. |
| 2016/0235201 A1 | 8/2016 | Soot |
| 2016/0240839 A1 | 8/2016 | Umeyama et al. |
| 2016/0258671 A1 | 9/2016 | Allard et al. |
| 2016/0290702 A1 | 10/2016 | Sexton et al. |
| 2016/0348957 A1 | 12/2016 | Hitzelberger et al. |
| 2017/0038126 A1 | 2/2017 | Lee et al. |
| 2017/0157809 A1 | 6/2017 | Deka et al. |
| 2017/0176086 A1 | 6/2017 | Kang |
| 2017/0191746 A1 | 7/2017 | Seo |

FOREIGN PATENT DOCUMENTS

| | | |
|---|---|---|
| CA | 2259665 A1 | 1/1998 |
| CA | 2640006 A1 | 8/2007 |
| CN | 1158509 A | 4/2002 |
| CN | 100359272 A | 12/2005 |
| CN | 1970185 A | 5/2007 |
| CN | 101437756 A | 5/2009 |
| CN | 201680116 U | 12/2010 |
| CN | 201748744 U | 2/2011 |
| CN | 102296714 A | 12/2011 |
| CN | 102452522 A | 5/2012 |
| CN | 102717578 A | 10/2012 |
| CN | 102720277 A | 10/2012 |
| CN | 103072321 A | 5/2013 |
| CN | 202973713 u | 6/2013 |
| CN | 203331442 U | 12/2013 |
| CN | 104816478 A | 8/2015 |
| CN | 105115221 | 12/2015 |
| CN | 2014963379 U | 1/2016 |
| DE | 1150190 B | 6/1963 |
| DE | 4110292 A1 | 10/1992 |
| DE | 19818890 A1 | 11/1999 |
| DE | 19915311 A1 | 10/2000 |
| DE | 102010024951 A1 | 12/2011 |
| DE | 102011051178 A1 | 12/2012 |
| DE | 102012223536 A1 | 6/2014 |
| DE | 102012223541 A1 | 6/2014 |
| EP | 0260699 A2 | 3/1988 |
| EP | 0480451 A1 | 4/1992 |
| EP | 0645576 A1 | 3/1995 |
| EP | 0691518 A1 | 1/1996 |
| EP | 0860669 A1 | 8/1998 |
| EP | 1087186 A2 | 3/2001 |
| EP | 1200785 A1 | 5/2002 |
| EP | 1243880 A1 | 9/2002 |
| EP | 1484563 A1 | 12/2004 |
| EP | 1496322 A1 | 1/2005 |
| EP | 1505359 A1 | 2/2005 |
| EP | 1602425 A1 | 12/2005 |
| EP | 1624263 A2 | 8/2006 |
| EP | 2342511 A2 | 7/2011 |
| EP | 2543942 A2 | 1/2013 |
| EP | 2607073 A2 | 6/2013 |
| EP | 2789951 A1 | 10/2014 |
| EP | 2878427 A1 | 6/2015 |

(56) References Cited

FOREIGN PATENT DOCUMENTS

| | | |
|---|---|---|
| FR | 2991698 A1 | 12/2013 |
| FR | 2980963 A1 | 4/2014 |
| GB | 837929 A | 6/1960 |
| GB | 1214548 A | 12/1970 |
| JP | 51057777 | 5/1976 |
| JP | 59191588 | 12/1984 |
| JP | 03013779 A | 1/1991 |
| JP | 04165197 | 10/1992 |
| JP | 04309778 A | 11/1992 |
| JP | 06159922 A | 6/1994 |
| JP | 7001479 | 1/1995 |
| JP | H07161377 A | 7/1995 |
| JP | 08300052 | 11/1996 |
| JP | H08303686 A | 11/1996 |
| JP | H09166271 A | 6/1997 |
| JP | 10113983 | 5/1998 |
| JP | 11159693 A | 6/1999 |
| JP | 11311395 | 11/1999 |
| JP | 11336990 | 12/1999 |
| JP | 2000097390 | 4/2000 |
| JP | 2000117334 A | 4/2000 |
| JP | 2000320958 A | 11/2000 |
| JP | 2001038188 A | 2/2001 |
| JP | 2001116437 A | 4/2001 |
| JP | 03478771 | 6/2001 |
| JP | 2001336691 A | 12/2001 |
| JP | 2001343176 | 12/2001 |
| JP | 2004303695 | 10/2004 |
| JP | 2005114015 | 4/2005 |
| JP | 2005164193 | 6/2005 |
| JP | 2005256849 A | 9/2005 |
| JP | 2006077792 A | 3/2006 |
| JP | 2006161834 A | 6/2006 |
| JP | 2006161945 A | 6/2006 |
| JP | 03792801 B2 | 7/2006 |
| JP | 2006200685 A | 8/2006 |
| JP | 2007263186 A | 10/2007 |
| JP | 4111096 B2 | 7/2008 |
| JP | 2008157431 A | 7/2008 |
| JP | 2009063064 A | 3/2009 |
| JP | 2009162402 A | 7/2009 |
| JP | 2009524570 A | 7/2009 |
| JP | 2010017437 A | 1/2010 |
| JP | 2010071565 A | 4/2010 |
| JP | 2010108199 A | 5/2010 |
| JP | 2010145002 A | 7/2010 |
| JP | 04545126 B2 | 9/2010 |
| JP | 2010236770 A | 10/2010 |
| JP | 2010276309 A | 12/2010 |
| JP | 2011002033 A | 1/2011 |
| JP | 2011069612 A | 4/2011 |
| JP | 04779684 B2 | 9/2011 |
| JP | 2011196644 A | 10/2011 |
| JP | 4828353 B2 | 11/2011 |
| JP | 2012026493 A | 2/2012 |
| JP | 2012063029 A | 2/2012 |
| JP | 04897473 B2 | 3/2012 |
| JP | 2013195009 A | 3/2012 |
| JP | 2012087993 A | 5/2012 |
| JP | 2012163258 A | 8/2012 |
| JP | 2012189114 A | 10/2012 |
| JP | 2012242075 A | 12/2012 |
| JP | 2013002484 A | 1/2013 |
| JP | 2013050242 A | 3/2013 |
| JP | 2013050267 A | 3/2013 |
| JP | 2013076471 A | 4/2013 |
| JP | 2013088036 A | 5/2013 |
| KR | 20020057547 | 7/2002 |
| KR | 20020080938 A | 10/2002 |
| KR | 20030083812 A | 11/2003 |
| KR | 20040000126 | 1/2004 |
| KR | 20050095357 A | 9/2005 |
| KR | 100620025 B1 | 9/2006 |
| KR | 1020070044024 A | 4/2007 |
| KR | 1020050126499 A | 6/2007 |
| KR | 1020080103845 | 11/2008 |
| KR | 20090026045 | 3/2009 |
| KR | 1017776 | 2/2011 |
| KR | 20120007241 | 1/2012 |
| KR | 2012046621 | 5/2012 |
| KR | 2012051305 | 5/2012 |
| KR | 20150089495 A | 8/2015 |
| RU | 2061925 C1 | 6/1996 |
| RU | 2077411 C1 | 4/1997 |
| RU | 2132522 C1 | 6/1999 |
| RU | 2162576 C2 | 1/2001 |
| RU | 2166158 C1 | 4/2001 |
| RU | 2187433 C2 | 8/2002 |
| RU | 2234645 C1 | 8/2004 |
| RU | 2252377 | 5/2005 |
| RU | 2253792 C2 | 6/2005 |
| RU | 2349618 C2 | 3/2009 |
| RU | 2414288 C2 | 3/2011 |
| RU | 2529525 C1 | 9/2014 |
| RU | 2571031 | 12/2015 |
| SU | 00476407 A1 | 7/1975 |
| SU | 648780 A1 | 2/1979 |
| SU | 01307186 A1 | 4/1987 |
| WO | 9614207 A1 | 5/1996 |
| WO | 1998049506 A1 | 11/1998 |
| WO | 02060576 A1 | 4/1999 |
| WO | 9614207 A1 | 4/1999 |
| WO | 9920961 A1 | 4/1999 |
| WO | 9920964 A1 | 4/1999 |
| WO | 199920964 | 4/1999 |
| WO | 200160598 | 8/2001 |
| WO | 200202987 | 1/2002 |
| WO | 2002052208 | 4/2002 |
| WO | 02060576 A1 | 8/2002 |
| WO | 03072684 A1 | 9/2003 |
| WO | 2003089729 A1 | 10/2003 |
| WO | 2004010042 A1 | 1/2004 |
| WO | 2006045694 | 5/2006 |
| WO | 2006073540 A2 | 7/2006 |
| WO | 2007033836 A1 | 3/2007 |
| WO | 2007085511 A1 | 8/2007 |
| WO | 2007106067 A2 | 9/2007 |
| WO | 2008118536 A2 | 10/2008 |
| WO | 2008122483 A2 | 10/2008 |
| WO | 2009013106 A2 | 1/2009 |
| WO | 2009112433 A1 | 9/2009 |
| WO | 2009147106 A1 | 12/2009 |
| WO | 2010007783 A1 | 1/2010 |
| WO | 2010029730 A1 | 3/2010 |
| WO | 2010043009 A2 | 4/2010 |
| WO | 2010092627 A1 | 8/2010 |
| WO | 2010127947 A2 | 11/2010 |
| WO | 2010127947 A3 | 2/2011 |
| WO | 2011058678 A1 | 5/2011 |
| WO | 2011003711 A3 | 6/2011 |
| WO | 2011081498 A3 | 11/2011 |
| WO | 2010007783 A1 | 1/2012 |
| WO | 2012023705 A3 | 4/2012 |
| WO | 2012026715 A3 | 6/2012 |
| WO | 2012043990 A3 | 6/2012 |
| WO | 2012044001 A3 | 6/2012 |
| WO | 2012119892 A1 | 9/2012 |
| WO | 2012031885 A3 | 1/2013 |
| WO | 2012085212 A9 | 7/2013 |
| WO | 2014038150 A1 | 3/2014 |
| WO | 2014095542 | 6/2014 |
| WO | 2014121893 A1 | 8/2014 |
| WO | 2014184393 A1 | 11/2014 |
| WO | 2013140816 A1 | 8/2015 |
| WO | 2016082907 A1 | 6/2016 |
| WO | 2017029782 A1 | 2/2017 |

OTHER PUBLICATIONS

BASF, "Balindur™," web page, 2 pages, date unknown, http://product-finder.basf.com/group/corporate/product-finder/en/brand/BALINDUR, at least as early as Dec. 21, 2015.

(56) References Cited

OTHER PUBLICATIONS

PU Solutions Elastogram, "Balindur™ masters the challenge," web page, 2 pages, date unknown, http://product-finder.basf.com/group/corporate/product-finder/en/literature-document:/Brand+Balindur–Flyer--Balindur+The+new+VIP+fixation+technology–English.pdf, Dec. 21, 2014.
European Patent Application No. 13775196.2, Supplemental Search Report, dated Dec. 7, 2015, 10 pages.
European Patent Application No. 14158608.1, Search Report, dated Sep. 30, 2014, 5 pages.
International Patent Application No. PCT/US2013036203, International Search Report, dated Jul. 26, 2013, 10 pages.
European Patent Application No. 15154577.9, Search Report, dated Jul. 20, 2015, 8 pages.
European Patent Application No. 14158619, Search Report, dated Jun. 22, 2015, 9 pages.
European Patent Application No. 15153481, Search Report, dated Jul. 10, 2015, 6 pages.
KitchenAid, "Refrigerator user instructions," Sep. 5, 2015, 120 pages.
International Searching Authority, "Search Report," issued in connection with International Patent Application No. PCT/US2016/062479, dated Feb. 9, 2017, 8 pages.
International Searching Authority, "Search Report," issued in connection with International Patent Application No. PCT/US2016/060947, dated Feb. 2, 2017, 8 pages.
International Searching Authority, "Search Report," issued in connection with International Patent Application No. PCT/US2016/061125, dated Jan. 12, 2017, 9 pages.
International Searching Authority, "Search Report," issued in connection with International Patent Application No. PCT/US2016/062453, dated Feb. 9, 2017, 8 pages.
International Searching Authority, "Search Report," issued in connection with International Patent Application No. PCT/US2016/061790, dated Jan. 26, 2017, 8 pages.
International Searching Authority, "Search Report," issued in connection with International Patent Application No. PCT/US2016/062029, dated Jan. 26, 2017, 8 pages.
International Searching Authority, "Search Report," issued in connection with International patent Application No. PCT/US2016/060961, dated Feb. 2, 2017, 9 pages.
International Search Report, International Application No. PCT/US2016/060519, dated Mar. 16, 2017, 10 pages.
International Search Report, International Application No. PCT/US2016/062804, dated Feb. 27, 2017, 9 pages.
International Search Report, International Application No. PCT/US2016/063023, dated Mar. 30, 2017, 7 pages.
International Search Report, International Application No. PCT/US2016/063065, dated Apr. 20, 2017, 9 pages.
International Search Report, International Application No. PCT/US2016/063355, dated Feb. 27, 2017, 9 pages.
International Search Report, International Application No. PCT/US2016/063958, dated Mar. 6, 2017, 10 pages.
International Search Report, PCT/US2016/043991, dated Apr. 27, 2017, 8 pages.
International Search Report, PCT/US2016/047558, dated Jun. 8, 2017, 9 pages.
International Search Report, PCT/US2016/062189, dated Mar. 30, 2017, 7 pages.
International Search Report, Application No. PCT/US2016/054067, dated Jun. 29, 2017, 7 pages.
International Search Report, Application No. PCT/US2016/054121, dated Jul. 6, 2017, 9 pages.
International Search Report, Application No. PCT/US2016055161, dated Jun. 29, 2017, 9 pages.
International Search Report, Application No. PCT/US2016/055304, dated Jun. 29, 2017, 9 pages.
International Search Report, PCT/US2016/053711, dated Aug. 31, 2017, 8 pages.
International Search Report, PCT/US2016/054639, dated Aug. 17, 2017, 8 pages.
International Search Report, PCT/US2016/057271, dated Aug. 17, 2017, 8 pages.
International Search Report, PCT/US2017/017802, dated Sep. 28, 2017, 9 pages.
International Search Report, PCT/US2017/019930, dated Sep. 28, 2017, 9 pages.
International Search Report, Application No. PCT/US2017/021068, dated Nov. 2, 2017, 9 pages.
International Search Report, Application No. PCT/US2016/020896, dated May 12, 2016. 3 pages.
European Search Report, Application No. EP14158615, dated Jun. 24, 2015, 5 pages.

* cited by examiner

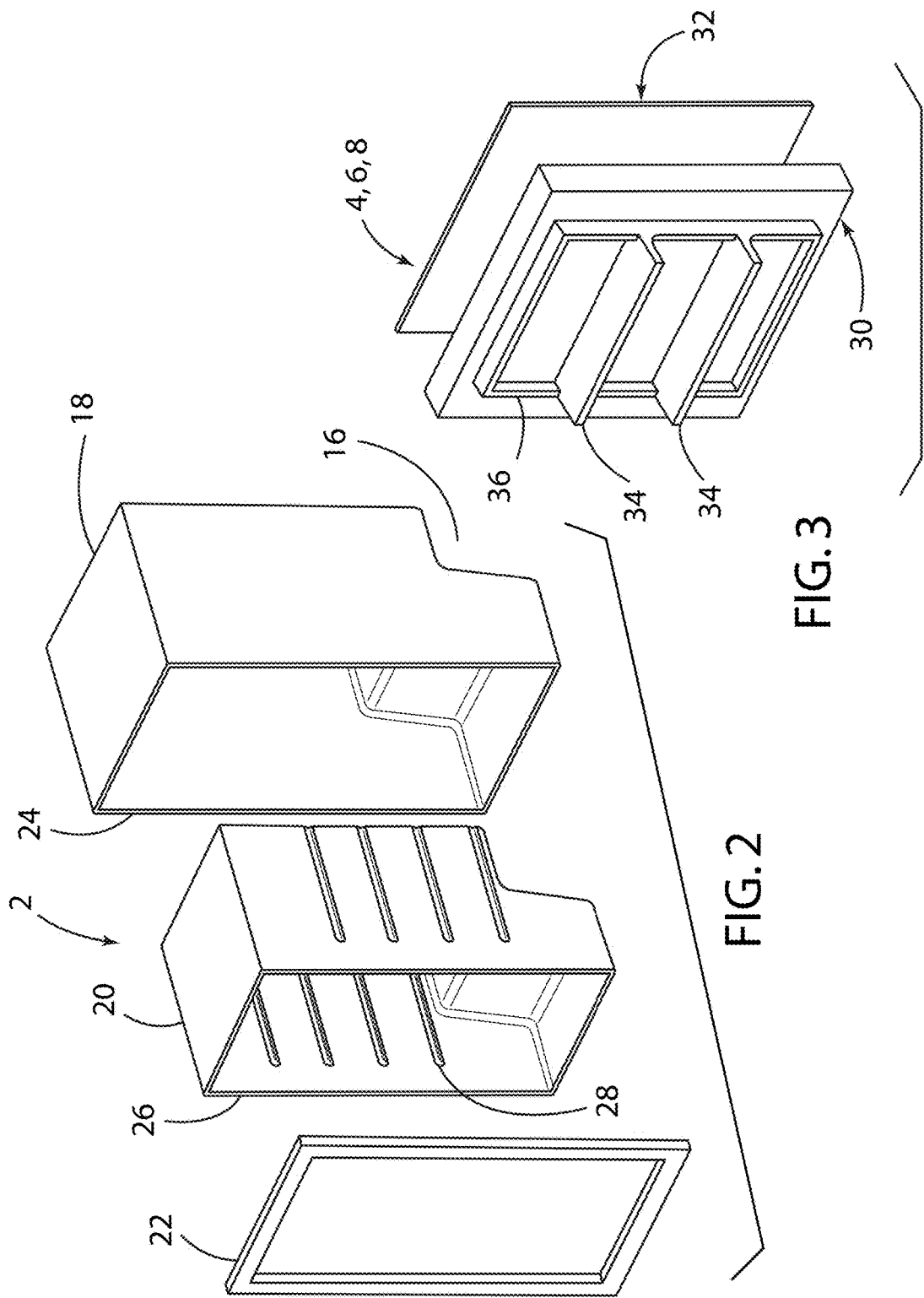

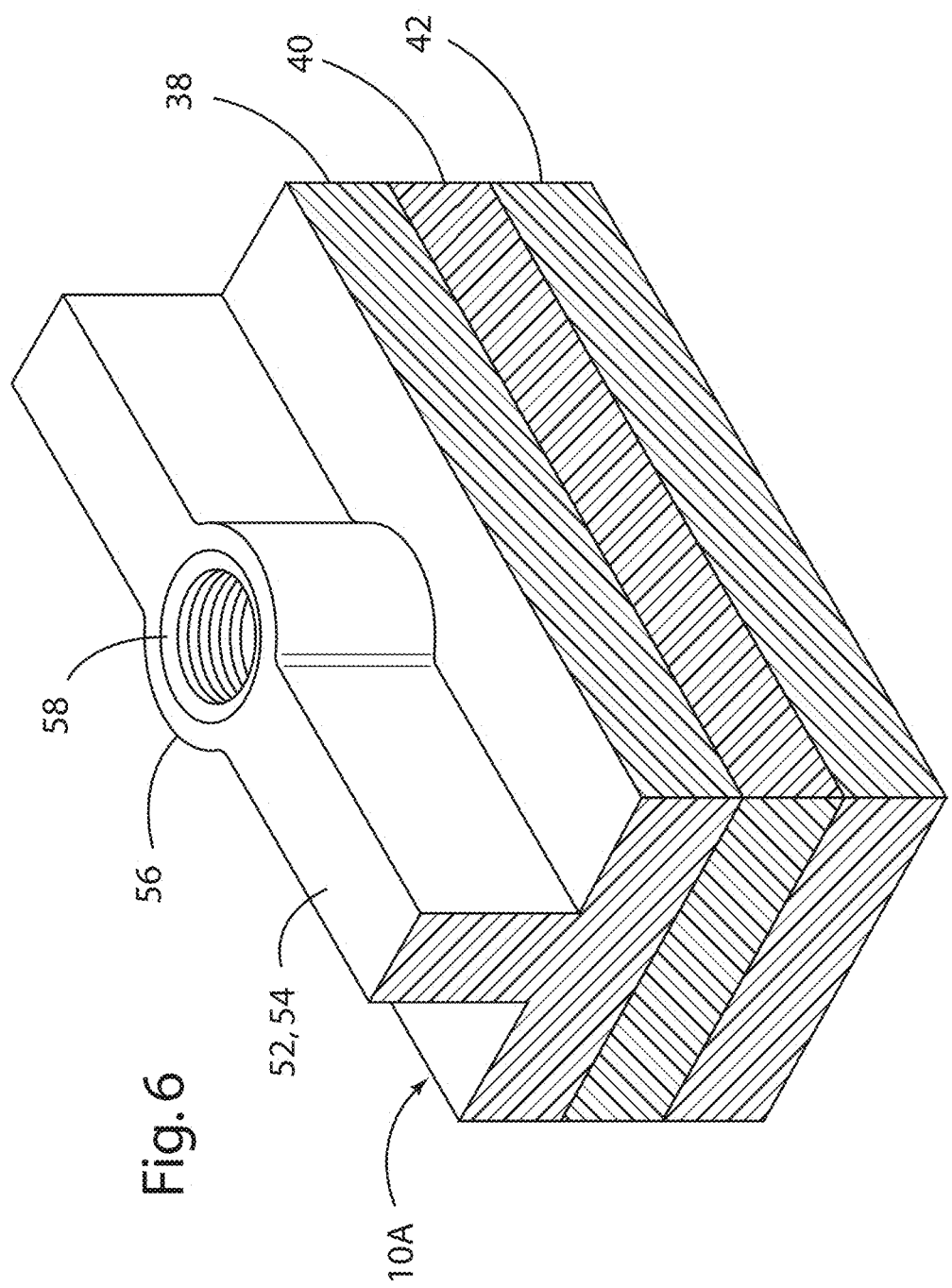

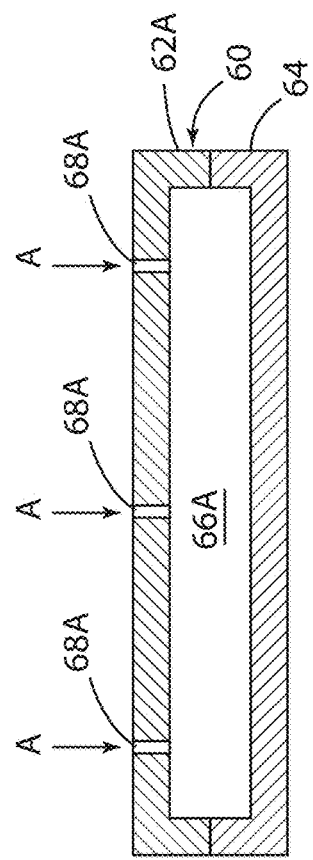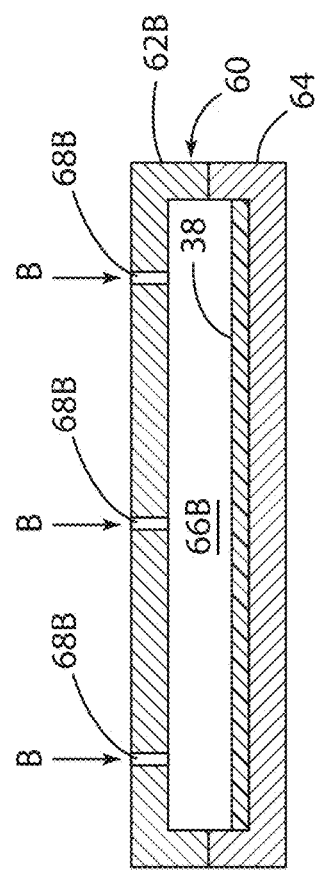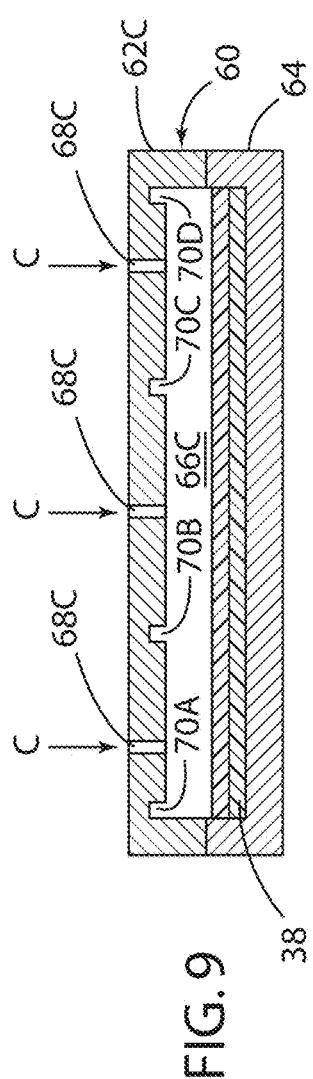

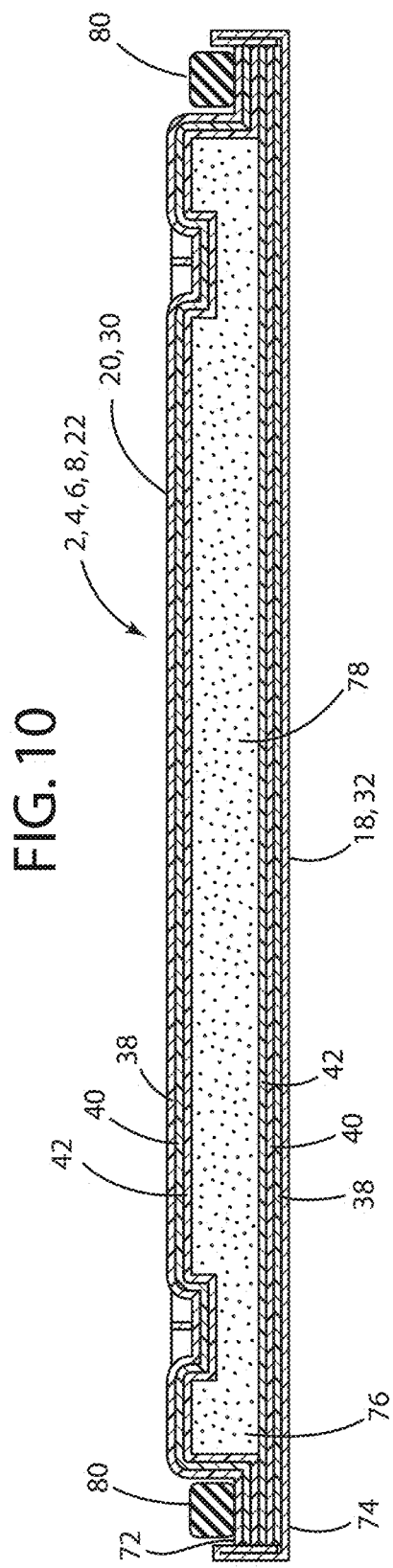

METHOD OF FABRICATING A VACUUM INSULATED APPLIANCE STRUCTURE

BACKGROUND OF THE INVENTION

Various types of vacuum insulated refrigerator cabinets and doors have been developed. However, known methods of fabricating vacuum insulated structures may suffer from various drawbacks.

SUMMARY OF THE INVENTION

One aspect of the present disclosure is a method of fabricating a vacuum insulated refrigerator structure. The method includes injection molding a first layer of a first polymer material. A second layer of a second polymer material is injection molded over at least a portion of the first layer, and a third layer of a third polymer material is injection molded over at least a portion of the second layer to form a first component such as a liner or a wrapper. A second component is secured to the first panel component to form a vacuum cavity therebetween. The vacuum cavity is filled with a porous material, and the vacuum cavity is evacuated to form a vacuum. At least one of the first and third layers includes a structural reinforcement such as a rib or screw boss of increased thickness that is formed during the injection molding process.

These and other features, advantages, and objects of the present disclosure will be further understood and appreciated by those skilled in the art by reference to the following specification, claims, and appended drawings.

BRIEF DESCRIPTION OF THE DRAWINGS

FIG. 2 is an exploded isometric view of a refrigerator cabinet;

FIG. 3 is an exploded isometric view of a refrigerator door;

FIG. 6 is a partially fragmentary isometric view showing an injection molded structural reinforcement feature;

FIG. 7 is a partially schematic view of a mold utilized for a first injection;

FIG. 8 is a partially schematic view of a mold utilized for a second injection;

FIG. 9 is a partially schematic view of a mold utilized for a third injection; and FIG. 10 is a cross sectional view of a vacuum insulated refrigerator structure according to one aspect of the present invention.

DETAILED DESCRIPTION

Figure 1:
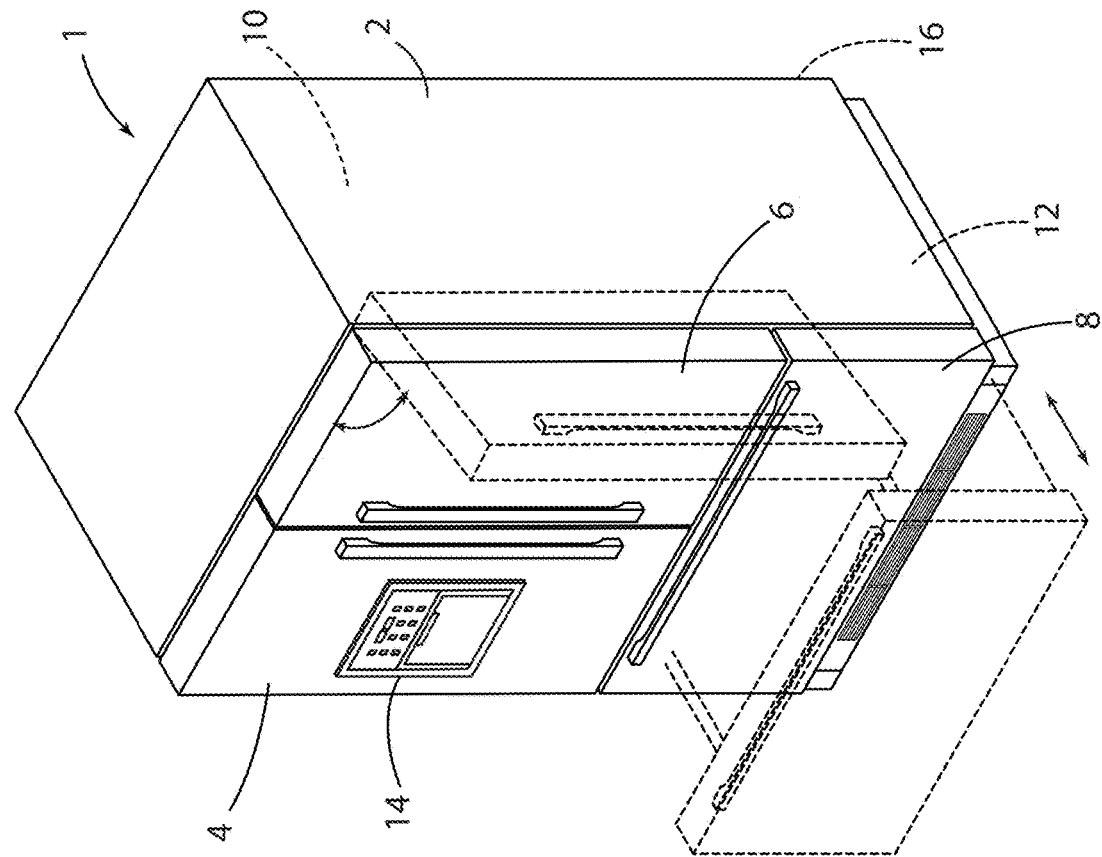
FIG. 1 is an isometric view of a refrigerator.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations and step sequences, except where expressly specified to the contrary. It is also to be understood that the specific devices and processes illustrated in the attached drawings, and described in the following specification, are simply exemplary embodiments of the concepts defined in the appended claims. Hence, specific dimensions and other physical characteristics relating to the disclosures herein are not to be considered as limiting, unless the claims expressly state otherwise.

With reference to FIG. 1, a refrigerator 1 may include a vacuum insulated cabinet structure 2, and one or more doors 4 and 6 that are movably mounted to the cabinet 2. The cabinet 2 may include an insulated fresh food compartment 10 that is accessible by opening doors 4 and 6, and a frozen food compartment 12 that can be accessed by opening drawer 8. Refrigerator 1 may also include an ice/water dispenser 14 mounted to door 4. Refrigerator 1 includes a cooling system (not shown) that may be mounted in a machine space 16 (see also FIG. 2) located in a lower rear portion of the refrigerator 1. The cooling system may comprise a compressor, condenser, evaporator, and other related components. Alternatively, the cooling system may comprise a thermoelectric system that utilizes thermoelectric elements.

With further reference to FIG. 2, cabinet 2 may comprise an outer wrapper 18 and an inner liner 20 that fits within the wrapper 18 when assembled. A trim breaker 22 may be utilized to seal front edge 24 of wrapper 18 to front edge 26 of liner 20. The wrapper 18 and/or liner 20, and/or trim breaker 22 may comprise multi-layer polymer structures that are impervious to atmospheric gasses such as oxygen, nitrogen, carbon dioxide, water vapor, and/or other gasses. These multi-layer structures may be formed utilizing a multistep injection molding process discussed below. Alternatively, only one or two of the components 18, 20, and 22 may be fabricated utilizing a multistep injection process. For example, wrapper 18 could comprise formed sheet metal, and liner 20 and trim breaker 22 could comprise a multilayer polymer structure. Various features such as ribs or raised portions 28 may be formed in liner 20, wrapper 18, and/or trim breaker 22 during the injection molding process as described in more detail below. As discussed in more detail below, the liner 20 and exterior wrapper 18 form an interior space or cavity between liner 20 and wrapper 18 when assembled, and the interior cavity is filled with a porous material. The cavity is then evacuated to form a vacuum insulated structure.

With further reference to FIG. 3, the doors 4 and 6 and/or drawer 8 may include a liner 30 and exterior wrapper or panel 32. The door liner 30 and exterior panel 32 may comprise multi-layer polymer structures that are impervious to gasses. These structures may be fabricated according to a process discussed below. Liner 30 may comprise shelves 34, raised reinforcing features 36, or other such three dimensional features that are formed during an injection molding process.

Figure 4:
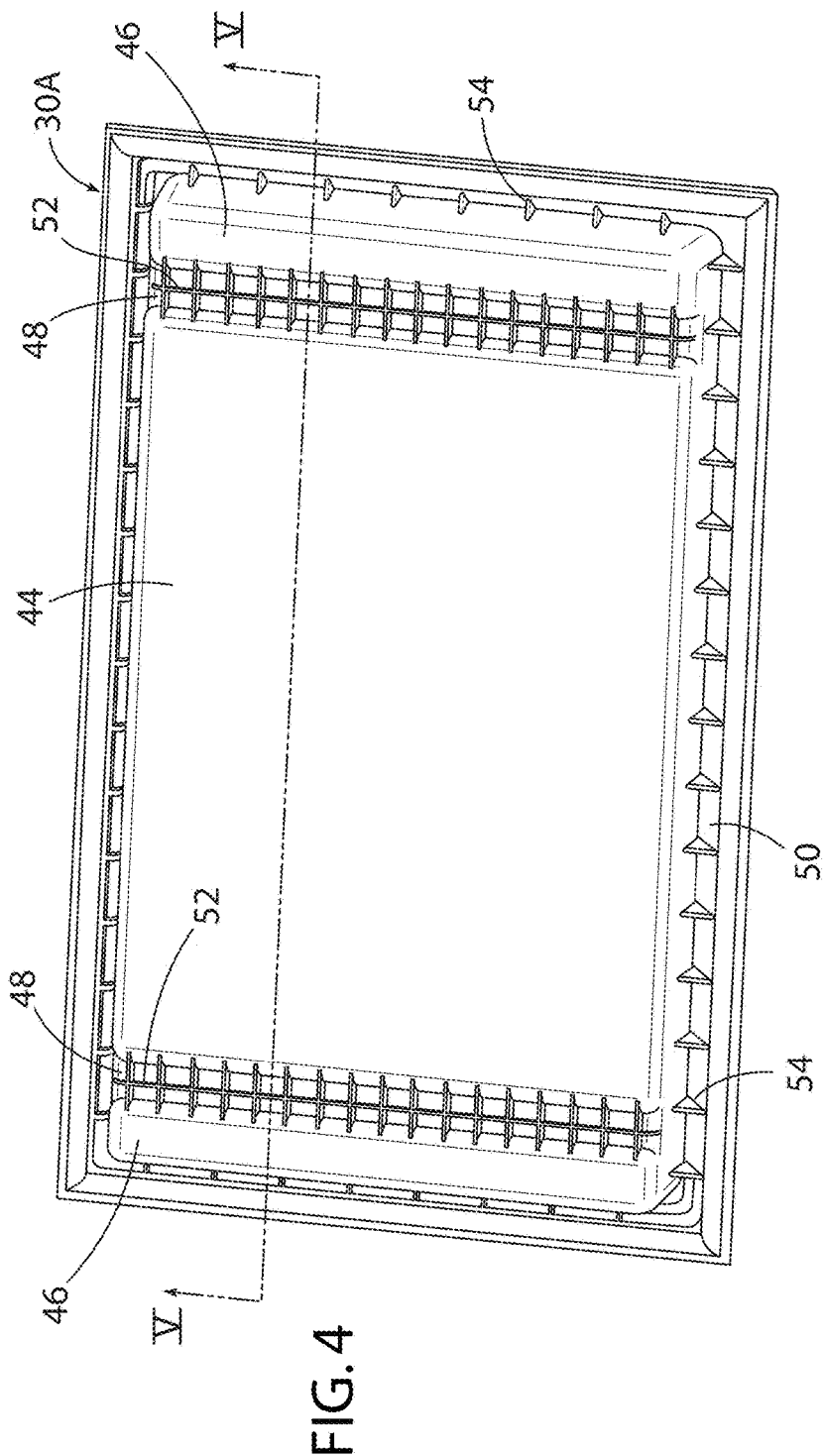
FIG. 4 is an isometric view of a door liner showing the inner side of the door liner.
Figure 5:
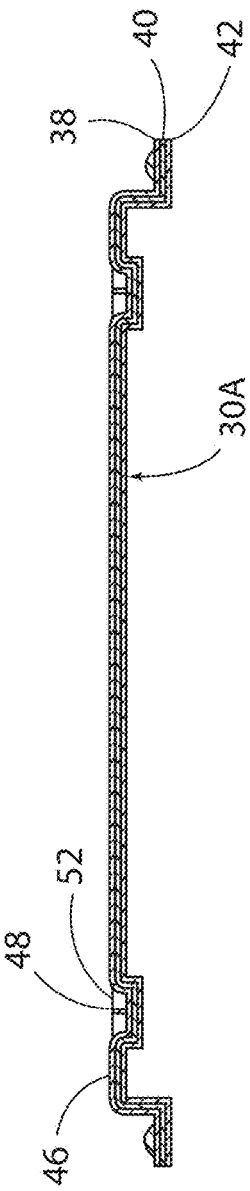
FIG. 5 is a cross sectional view of the door liner of FIG. 4 taken along the line V-V.

With further reference to FIGS. 4 and 5, a liner 30A includes first, second, and third layers of polymer material 38, 40, and 42, respectively. The first layer 38 may form an interior side 44 of liner 30A. Layer 38 may include raised portions 46, grooves or lower portions such as linear channels 48, a perimeter channel 50, and reinforcing ribs 52 and 54 that extend across the grooves 48 and perimeter channel 50, respectively. As discussed below, an injection molding process according to the present disclosure provides for formation of complex three dimensional features such as raised portions 46, grooves and channels 48 and 50, respectively, and ribs 52 and 54, respectively.

In a liner or other component according to the present disclosure, the first layer 38 and third layer 42 may comprise a nylon thermoplastic material, and the second layer 40 may comprise a relatively thin layer of Ethylene Vinyl Alcohol (EVOH). According to another aspect of the present disclosure, a liner 30A or other component may include a first layer 38 and third layer 42 that comprise a High Impact Polystyrene (HIPS), and the second layer 40 may comprise a relatively thin layer of EVOH. In general, EVOH is a good barrier to oxygen, but it is not a particularly good barrier with respect to water vapor. Accordingly, one or both of the layers 38 and/or 42 may comprise a material that provides a water vapor barrier. For example, layer 38 and/or layer 42 could comprise barrier nylon or a liquid crystal polymer. Alternatively, a fourth layer (not shown) of material such as Tetrafluoroethylene (THV), polychlorotrifluoroethylene (PCTFE), Cyclic Olefin Copolymer (COC), Cyclic Olefin Polymer (COP) or high density polyethylene (HDPE) providing a water vapor barrier may be injection molded between layers 38 and 40 or between layers 40 and 42. In general, the materials utilized to form layers 38, 40, 42 and/or additional layers may be chosen to provide specific barrier properties with respect to oxygen transmission, water vapor transmission, structural properties, and cost considerations.

With further reference to FIG. 6, the component 10A may be molded to include additional structural features such as a screw boss 56 that receives a threaded insert 58. The ribs 52, 54 and/or screw boss 56 or other such features may be formed by injection molding at the time first and/or third layers 38 and 42 are being formed. It will be understood that a wide range of three dimensional features may be formed during the injection molding process whereby layer 38 and/or 42 have a non-uniform thickness.

With further reference to FIGS. 7-9, a molding tool 60 includes a lower mold part 64, and first, second, and third upper parts 62A, 62B, and 62C, respectively. During a first molding step (FIG. 7), molten polymer material is injected through ports 68A in mold part 62A as shown by the arrows "A." The molten material flows into a first mold cavity 66A defined by mold parts 62A and 64 to form a first layer 38 (FIG. 8). After the first polymer material is injected, additional polymer material is injected through ports 68B as shown by the arrows "B" (FIG. 8) to fill a second cavity 66B defined by mold tools 62B and 64 to form a second layer 40 (FIG. 9) that extends over at least a portion of first layer 38. With further reference to FIG. 9, a third polymer material is then injected through ports 68C of mold part 62C as shown by the arrows "C" to fill cavity 66C and form a third layer 42 (see also FIGS. 5 and 6). The mold part 62C may include one or more cavities or other features 70A-70D that form ribs 52, 54 and/or screw bosses 56 and/or other such 3D features whereby the component formed by the tooling/process of FIG. 7-9 has a non-uniform thickness. The mold part 64 may also include one or more cavities or other such features that are similar to the features 70A-70D to thereby form three dimensional features in first layer 38.

With further reference to FIG. 10 a vacuum insulated refrigerator structure such as a cabinet 2, doors 4, 6, and/or drawer 8, and/or a trim breaker 22 may include an outer component such as wrapper 18 or exterior panel 32, and an interior liner 20 or 30. The components 18, 20, 30, and/or 32 may comprise three or more layers of polymer material 38, 40, and 42 that are configured to provide a barrier to gas as discussed above. During assembly, perimeter edge portions or flanges 72 and 74 of the wrapper 18 and liner 20 are sealed together to form an interior space 76. The interior space 76 is then filled with silica powder 78 or other suitable material, and a vacuum is formed in the interior space 76. The vacuum may be formed by placing the assembled structure in a vacuum chamber (not shown), and an access opening or port in wrapper 18 and/or liner 20 may then be closed and sealed to seal off interior space 76. The assembly is then removed from the vacuum chamber. Once the interior space 76 is sealed, the vacuum assembly forms a vacuum insulated refrigerator structure such as cabinet 2, doors 4, 6, drawer 8, or other such refrigerator structure. If the structure comprises a refrigerator cabinet 2, a trim breaker 22 may be utilized to seal edge 24 of wrapper 18 to edge 26 of liner 20 as discussed above in connection with FIG. 2. If the vacuum insulated refrigerator structure comprises a door, a resilient seal strip 80 or the like may be positioned adjacent edge portions 72 and 74 to thereby seal the door 4 or 6 (or drawer 8) when in a closed position.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A method of fabricating a vacuum insulated appliance structure, the method comprising:
    injection molding a first layer of a first thermoplastic polymer material;
    injection molding a second layer of a second thermoplastic polymer material over at least a portion of the first layer;
    injection molding a third layer of a third thermoplastic polymer material over at least a portion of the second layer to form a first component;
    securing a second component to the first component to form a vacuum cavity therebetween;
    filling the vacuum cavity with a filler material; and
    evacuating the vacuum cavity;
    wherein at least one of the first and third layers includes a structural reinforcement of increased thickness formed during the injection molding process, and wherein at least one of the first, second, and third polymer materials is impervious to at least one of oxygen, nitrogen, and water vapor.

2. The method of claim 1, wherein:
    the second layer comprises ethylene vinyl alcohol (EVOH).

3. The method of claim 2, wherein:
    the second layer is thinner than the first and third layers.

4. The method of claim 3, wherein:
    at least one of the first and third layers comprises a nylon material.

5. The method of claim 3, wherein:
    at least one of the first and third layers comprises a high impact polystyrene (HIPS) material.

6. The method of claim 1, wherein:
    the first component comprises a refrigerator cabinet liner, and the second component comprises a refrigerator cabinet wrapper.

7. The method of claim 6, wherein:
    the refrigerator cabinet wrapper is formed from sheet metal.

8. The method of claim 6, wherein:
    the refrigerator cabinet wrapper is formed by injection molding a plurality layers of thermoplastic polymer materials, wherein at least one of the plurality layers of thermoplastic polymer materials is impervious to at least one atmospheric gas.

9. The method of claim 6, wherein:
the wrapper and the liner include a generally planar central wall portion, and four sidewalls that extend transversely from the central wall portion.

10. The method of claim 1, wherein:
the structural reinforcement comprises a rib.

11. The method of claim 1, wherein:
the structural reinforcement comprises a screw boss.

12. The method of claim 1, wherein:
the vacuum insulated appliance structure comprises a refrigerator cabinet or a refrigerator door.

13. The method of claim 1, wherein:
the vacuum insulated appliance structure comprises an ice dispenser housing.

14. The method of claim 1, wherein:
the vacuum cavity is evacuated by placing the first and second components in a vacuum chamber.

15. The method of claim 1, wherein:
the first component comprises a trim breaker, and the second component comprises a wrapper or a liner.

\* \* \* \* \*